Dec. 12, 1967  C. O. LARSON  3,357,670
TWO-WAY SPRING LOCK HOOK
Filed July 6, 1966
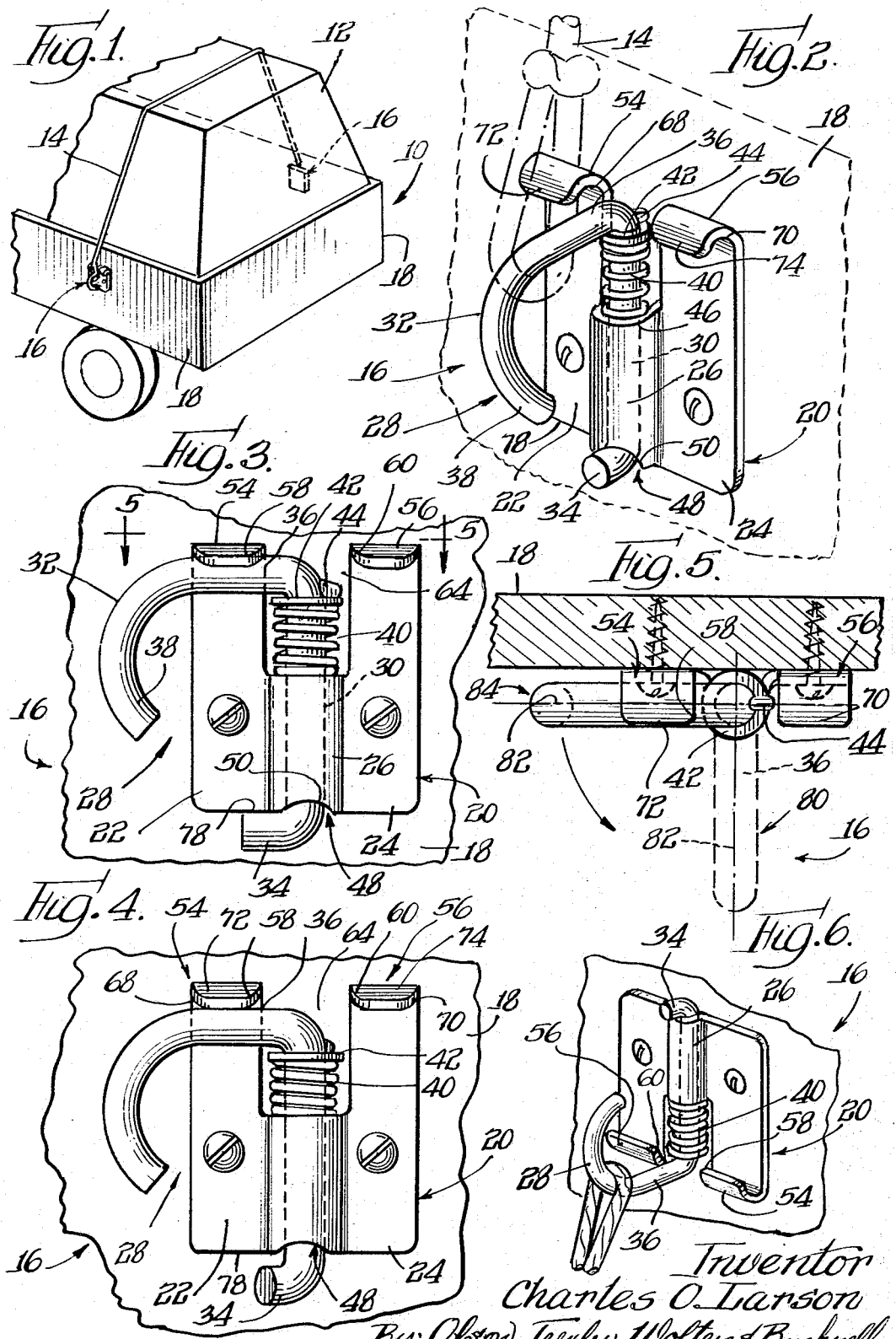
Inventor
Charles O. Larson
By: Olson, Trexler, Wolters & Bushnell
Attys.

United States Patent Office 3,357,670
Patented Dec. 12, 1967

3,357,670
TWO-WAY SPRING LOCK HOOK
Charles O. Larson, Sterling, Ill., assignor to Chas. O. Larson Co., Sterling, Ill., a corporation of Illinois
Filed July 6, 1966, Ser. No. 563,189
11 Claims. (Cl. 248—361)

ABSTRACT OF THE DISCLOSURE

In a load tiedown assembly, a bracket having a protruding ear and a positioning notch combined with a load tiedown engaging member that is pivotally mounted on the bracket, the load tiedown engaging member having a positioning arm which engages the notch in an operational position and having a load leg which engages the ear in a different rotational position for storage of the load tiedown engaging member.

---

This invention relates generally to a hook assembly and more particularly to an assembly wherein a hook member can be moved from an operational or load engaging position to a storage position.

Hooks are commonly fixedly secured to a support surface with the hook in an outwardly projecting position. When such a hook is not being used, it tends to be caught or snagged on people or things moving in the general area of the hook. The prior art solution to this problem consists of providing a pivotable hook or ring which can be swung from an out of the way storage position to an outwardly projecting operational position.

The widespread use of pivoting hooks and rings is eloquent testimony to their generally satisfactory service. However, prior art pivotable hooks are often unsatisfactory, for many purposes, due to their inability to be securely latched in either a storage position or an operational load bearing position. When prior art pivotable hooks are in a storage position they can be accidentally pushed into the operational position wherein the hook will project outwardly and constitute a hazard to personnel carrying on activities in the area. Similarly, prior art pivotable hooks can be easily knocked from the operational or load engaging position to the storage position while attempting to secure a load to the hook.

Therefore, one of the objects of this invention is to provide a hook assembly wherein a pivotal hook member is retained in both a storage and an operationl position.

Another object of this invention is to provide a hook which can be easily latched in a storage position.

Another object of this invention is to provide a hook which can be readily swung from a latched storage position to an operational position.

Another object of this invention is to provide a hook which is resiliently retained in an operational position and will automatically move back to the operational position when inadvertently knocked from that position.

These and other objects and features of the invention will become more apparent from a reading of the following detailed description taken in conjunction with the accompanying drawings, wherein:

FIG. 1 is a perspective view of a trailer on which are mounted a pair of hook assemblies forming a preferred embodiment of the invention;

FIG. 2 is an enlarged perspective view of the hook assembly of FIG. 1 in the load engaging or operational position;

FIG. 3 is an enlarged view of the hook assembly of FIG. 2 in the storage position;

FIG. 4 is an enlarged view of the hook assembly of FIGS. 2 and 3 with the hook positioned intermediate the storage and operational or load engaging positions;

FIG. 5 is a top view of the hook assembly of FIG. 2 illustrating the path of movement of the hook from the storage position, shown in FIG. 5, to the load engaging position, shown in FIG. 2; and FIG. 6 is a perspective view of the hook assembly in a load engaging position inverted from that shown in FIG. 2.

Referring now to the drawings in greater detail, there is shown in FIG. 1 a trailer 10 on which a load 12 is retained by a rope or cable 14. The rope or cable 14 engages a pair of hook assemblies 16 which are mounted on opposite sides 18 of the trailer 10. An enlarged perspective view of the hook assembly 16 is shown in FIGS. 2 and 3. The hook assembly includes a mounting bracket or base 20 having a pair of spaced apart rectangular base plates 22 and 24 which are interconnected by a retaining sleeve 26.

A load engaging hook 28 is pivotably mounted in the retaining sleeve 26. The hook 28 includes a central body section 30, an outwardly projecting load engaging hook arm 32, and an outwardly projecting positioning arm or lug 34. The central body section 30 is in rotatable contact with an inner surface of the sleeve 26. The load engaging hook arm 32 includes a leg member 36 which is integrally formed with the body 30 of the hook and an arcuate bend 38 which is formed from the outermost projecting end of the leg 36. The hook arm 32 is utilized, when in the load engaging or operational position shown in FIG. 2, for securing loads to the hook assembly 16.

The load engaging hook 28 is resiliently retained in the outwardly projectng operational position, shown in FIG. 2, by means of a spring 40 which is coaxially mounted with the body section 30 of the hook. The spring 40 presses upwardly against a thrust washer 42 which is held in position on the body section by an outwardly projecting tang or tab 44. The spring 40 also presses downwardly against an upper outwardly projecting arcuate surface 46 of the sleeve 26 to resiliently press the outwardly projecting positioning arm 34 into engagement with an arcuate recess or positioning notch 48 which is formed in the base of the sleeve 26.

The positioning notch or recess 48 is located in axial alignment with the body section 30 of the hook and the spring 40. The outwardly projecting positioning arm 34 is formed in a parallel relationship with the outwardly projecting leg 36 of the load engaging hook 28. Thus, the spring 40 presses the hook upwardly to force the positioning arm 34 into engagement with the uppermost portion of the recess 48. Since the recess 48 is in axial alignment with the center of the bracket 20, the hook is resiliently retained by the spring 40 in the operational position, that is, projecting ouwardly at right angles to the bracket 20.

The recess 48 is formed with an inwardly curving lower arcuate camming surface 50 which is positioned in sliding engagement with the cylindrical outer surface of the positioning arm 34. The curved camming surface 50 automatically tends to cam the positioning arm 34 inwardly into the operational position wherein the longitudinal axis of the positioning arm 34 is substantially perpendicular to a longitudinal axis of the bracket 20. This camming action, as previously mentioned, is brought about under the influence of the spring 40 which exerts an upward force on the hook 28.

The base plates 22 and 24 include a pair of spaced apart arcuate outwardly projecting retaining ears or tabs 54 and 56 which are integrally formed with the bracket 20. As is perhaps best seen in FIG. 4, the curved outwardly projecting retaining ears 54 and 56 have smooth arcuate cam surfaces 58 and 60 which curve outwardly from a central recess 64 formed between the upwardly extending base plates 22 and 24. The curved arcuate camming surfaces 58 and 60 serve to engage the rounded cylindrical upper surface of the hook leg 36 to cam the hook downwardly, against the upward force of the spring 40, when the hook is swung to either the left, as shown in FIG. 4, or the right. As the hook is shifted against the camming surfaces 58 or 60, and is moved downwardly by the camming action of these surfaces, the leg member 36 slides under one of the retaining ears 54 or 56.

As the hook 28 is pivoted inwardly and downwardly, under the camming action of a surface 58 or 60, the positioning arm 34 moves out of engagement with the recess 48 to permit the hook to swing under the retaining ear 54 or 56. As the pivotable movement of the hook is continued, the upper surface of the hook leg 36 is brought into abutting engagement with an inner surface 68 or 70 (see FIGS. 2 and 4) of the retaining ears 54 and 56. As the hook is swung inwardly, a downwardly turned lip portion 72 or 74 of the ears 54 or 56 slide over the leg 36 of the hook. When the hook has been moved to the storage position, as shown in FIG. 3, the downwardly extending lip 72 or 74 engage the leg 36 of the hook to hold the hook in the storage position. The spring member 40, when the leg 36 of the hook has cleared the downwardly turning lip 72 or 74 of the ear 54 or 56, forces the hook upwardly into the storage position wherein the positioning arm 34 is located in an abutting relationship with a lower surface 78 of the bracket 20. The hook 28 is then positioned flush against a base plate 22 or 24 and retained there by the downwardly projecting ear 72 or 74.

The path of movement of the hook from the outwardly projecting operational position to the storage position is illustrated in FIG. 5. When the hook is in the operational position indicated at 80 by dashed lines, a longitudinal axis 82 of the leg 36 is located in a position perpendicular to a transverse axis of the bracket 20 and the support member 18. As the hook is swung from the operational position 80 to the storage position indicated in solid lines at 84 in FIG. 5, the upper surface of the leg 36 engages the camming surface 58 of the ear 54 to press the hook downwardly. After the downwardly turned lip 72 of the ear 54 has been cleared by the axis 82 of the leg 36, the spring 40 forces the hook upwardly and inwardly into an abutting relationship with an inner surface 68 of the retaining ear 54 to swing the hook to a storage position.

The hook is securely retained in the storage position, indicated at 84 in FIG. 5, by the downwardly projecting ear 72. When the hook is in the storage position, the longitudinal axis 82 of the leg 36 is positioned in an attitude substantially parallel to a transverse axis of the bracket 20 and the support member 18. It will be apparent to those skilled in the art that the process of swinging the hook into a storage position adjacent to the base plate 24, and under the outwardly projecting ear 56, is substantially the same as the above process for swinging the hook into a storage position adjacent to the base plate 22 and underlying the outwardly projecting ear 54.

The hook 28 can be swung from the storage position, indicated in solid lines at 84 in FIG. 5, to the operational position, indicated in dashed lines at 80 in FIG. 5, by manually depressing the hook, against the upward force of the spring 40, and swinging the hook outwardly away from the base plate 22. After the leg 36 of the hook has cleared the downwardly projecting lip 72 of the ear 54, the hook can be released. The upward force of the spring 40 causes the leg 36 to engage the camming surface 58 which cams the hook outwardly toward the operational position. After the leg 36 has cleared the camming surface 58 of the ear 54, the camming surface 50, of the recess 48 in the base of the sleeve 26, cams the positioning arm 34 outwardly to swing the hook to the operational position. Thus, the combination of the camming surfaces 58 and 50 and the spring 40 causes the hook to automatically assume the operational position once the leg 36 is cleared of the downwardly projecting lip 72 of the retaining ear 54.

The hook is resiliently held in the operational position by the action of the spring 40 which presses the positioning arm 34 into the recess 48. If the hook should be struck with a sidewardly directed blow, the hook will swing downwardly, against the camming surface 50 and spring 40. Once the sideward force is removed, the hook automatically snaps back to the operational position. This resilient mounting of the hook in the operational position prevents the hook from being broken by a sideward force. The resilient mounting is also a safety feature for personnel working in the area of the hook, since the hook, when bumped against by the personnel, is resiliently deflected rather than injuring the personnel.

Referring now to FIG. 6, the hook assembly 16 is shown in a position inverted from that of FIG. 2. In this position the legs 36 of the hook can be utilized as a supporting member for a downwardly directed load. It will be apparent to those skilled in the art that the spring 40 presses the hook downwardly to retain the positioning arm 34 in the recess 48. Similarly, the camming surfaces 58 and 60 cam the hook upwardly to secure the hook in an abutting relationship in the storage position with the ears 54 and 56.

The operation of a hook assembly constructed as illustrated in FIGS. 1 to 6 will be largely apparent from the foregoing description. However, the operation may be briefly summarized as follows: the hook assembly 16 includes a hook member 28 which can be swung from an outwardly projecting operational position to a storage position against the mounting bracket 20. As the hook is pivoted from the operational position to the storage position, the camming surface 50 will force the positioning arm 34 downwardly. As the hook is swung further toward the storage position, the camming surface 58 will engage the upper surface of the leg 46 to continue the downward movement of the hook relative to the bracket 20. After the hook has cleared the downwardly projectnig lip 72, the spring 40 will force the hook upwardly into an abutting engagement with an inner surface of the retaining ear 54.

The hook 28 is swung from the storage position, shown in FIG. 3, to a load engaging position by substantially reversing the above procedure. That is, the hook leg 36 is manually depressed to clear the downwardly projecting lip 72 of the ear 54 and the hook is pivoted outwardly relative to the base 20. After the leg 36 has cleared the downwardly turned lip 72 of the ear 54, the hook can be released and the upward force of the spring 40 will cause the leg 36 to engage the camming surface 58 which will swing the hook outwardly toward the operational position. As the lg 36 clears the camming surface 54, the positioning arm 34 will be brought into engagement with the camming surface 50 of the recess 48. The camming surface 50 will continue the inward pivotal movement of the hook relative to the base as the hook is moved upwardly under the influence of the spring 40. Once the hook has swung to the operational position, the spring 40 will retain the positioning arm 34 in resilient engagement with the recess 48 to resiliently hold the hook in the operational position. If, while the hook is in the operational position, the hook is struck by a side blow, the hook will merely be forced sideways and downwardly by the interaction of the camming surface 50 and spring 40. Once the side load has been released, the hook will pivot back to the operational position under the influence of the camming surface 50 and spring 40.

In the preferred embodiment illustrated in FIGS. 1 to 6, a pair of retaining ears 54 and 56 have been provided so that the hook may be swung either to the left or to the right, as desired. It will be apparent, of course, that one of the retaining ears and its associated base plate could be, if desired, omitted. Although an outwardly projecting positioning arm 34 is utilized in a preferred embodiment of the hook assembly, it is contemplated that a hemispherical positioning member could be used. It is also contemplated that the load engaging hook 32 could, if desired, be replaced by other load engaging structures, depending upon the environment in which the assembly is to be used. Therefore, while a particular embodiment of the invention has been shown, it should be understood, of course, that the invention is not limited thereto, since many modifications may be made; and it is, therefore, contemplated to cover by the appended claims any such modifications as fall within the true spirit and scope of the invention.

What is claimed is:

1. In a tiedown assembly, the combination comprising: base means for attachment to a primary structure; a load tiedown engaging means mounted on said base means, said load tiedown engaging means being pivotable from a first storage position adjacent to said base means to a second operational position extending outwardly from said base means; a first retaining means supported by said base means for holding said load tiedown engaging means in said first storage position; a second retaining means supported by said base means for holding said load engaging means in said second operational position; and a spring means supported by said base means, said spring means urging said load tiedown engaging means into engagement with said first retaining means when said load tiedown engaging means is in said first storage position and said spring means urging said load tiedown engaging means into engagement with said second retaining means when said load tiedown engaging means is in said second operational position.

2. The combination set forth in claim 1 wherein said first retaining means includes an arcuate ear means for confining said load tiedown engaging means and wherein a portion of said load tiedown engaging means abuts an inner surface of said arcuate ear means when said load tiedown engaging means is in said first storage position.

3. The combination set forth in claim 1 wherein said load tiedown engaging means includes a positioning arm and wherein said second retaining means includes a positioning recess means for engaging said positioning arm when said load tiedown engaging means is in said second position.

4. The combination set forth in claim 1 wherein said first retaining means includes an arcuate outwardly projecting ear means for confining said load tiedown engaging means, wherein said second retaining means includes a positioning recess means for a positioning arm, and wherein said load tiedown engaging means includes an outwardly extending hook means and an outwardly extending positioning arm, said ear means engaging said hook means when said load tiedown engaging means is in said first storage position and said positioning arm being in resilient engagement with said positioning recess means when said load tiedown engaging means is in said second operational position, whereby said load tiedown engaging means is securely latched by said ear means in said first storage position and is resiliently held in said second operational position in said positioning recess means.

5. The combination set forth in claim 4 wherein said ear means includes cam means for facilitating movement of said load tiedown engaging means from said second operational position to said first storage position.

6. The combination set forth in claim 4 wherein said positioning recess means has an arcuate cam surface for facilitating movement of said load tiedown engaging means from said first storage position to said second operational position.

7. In a tiedown assembly, the combination comprising: a bracket; an outwardly protruding ear integrally formed with said bracket; a positioning notch formed in said bracket; a load tiedown engaging member pivotably mounted on said bracket, said load tiedown engaging member having a central body section, a load leg extending from a first end of said body section, and a positioning arm extending from a second, opposite end of said body section; and a spring mounted coaxially with said body section, said spring pressing said load leg into abutting engagement with said ear when said load tiedown engaging member is in a storage position, and said spring resiliently pressing said positioning arm into said positioning notch when said load tiedown engaging member is in an operational position.

8. The combination set forth in claim 7 wherein said ear includes an inner surface and an arcuate surface for camming said load leg into abutting engagement with said inner surface when said load tiedown engaging member is pivoted from said operational position to said storage position.

9. The combination set forth in claim 7 which further includes a second ear integrally formed with said bracket, said load tiedown engaging member being pivotable to a second storage position abutting said second ear.

10. The combination set forth in claim 7 wherein said notch includes an arcuate surface for camming said positioning arm into said recess to automatically pivot said load tiedown engaging member to said operational position when said load leg is moved out of abutting engagement with said ear.

11. The combination set forth in claim 10 wherein said load leg and said positioning arm extend outwardly from said body section in substantially the same direction.

References Cited
UNITED STATES PATENTS

| | | | |
|---|---|---|---|
| 1,136,286 | 4/1915 | Stafford | 248—290 |
| 2,134,823 | 11/1938 | Herrmann | 248—361 |
| 3,082,990 | 3/1963 | Nelson | 248—308 |
| 3,223,375 | 12/1965 | Bernasconi | 248—361 |

JOHN PETO, *Primary Examiner.*